United States Patent [19]
Johnson et al.

[11] 3,926,388
[45] Dec. 16, 1975

[54] SEQUENTIAL HELICOPTER BLADE EJECTION SYSTEM

[75] Inventors: John W. Johnson, Cromwell; Robert A. Selleck, Trumbull, both of Conn.

[73] Assignee: United Technologies Corporation, Hartford, Conn.

[22] Filed: June 13, 1973

[21] Appl. No.: 369,691

Related U.S. Application Data

[63] Continuation of Ser. No. 207,813, Dec. 14, 1971, abandoned.

[52] U.S. Cl. ................................ 244/17.11; 89/1 B
[51] Int. Cl.² .......................................... B64C 27/00
[58] Field of Search ........... 244/17.11, 17.15, 17.17, 244/17.13, 17.25, 17.27; 416/2; 89/1 B; 102/24 HC

[56] References Cited
UNITED STATES PATENTS

| | | | |
|---|---|---|---|
| 3,185,090 | 5/1965 | Weber | 102/24 HC |
| 3,229,931 | 1/1966 | Larsen | 244/17.11 |
| 3,352,236 | 11/1967 | Baker et al. | 244/17.11 X |
| 3,778,008 | 12/1973 | Ingham et al. | 244/17.11 |

Primary Examiner—Trygve M. Blix
Assistant Examiner—Stephen G. Kunin
Attorney, Agent, or Firm—Vernon F. Hauschild

[57] ABSTRACT

The helicopter blades are sequentially ejected in a predetermined direction during a single rotor revolution to minimize danger of blades flying into the path of adjacent aircraft and permit personnel ejection after blade jettisoning, and a backup system is provided to simultaneously jettison all the blades if the primary sequencing ejection system malfunctions in whole or in part. The sequencing system permits programming of the blade jettisoning order to minimize aircraft attitude change during the jettisoning sequence.

34 Claims, 8 Drawing Figures

SEQUENTIAL HELICOPTER BLADE EJECTION SYSTEM

This is a continuation, of application Ser. No. 207,813, filed Dec. 14, 1971, now abandoned.

BACKGROUND OF THE INVENTION

1. Field of Invention

This invention relates to the jettisoning of helicopter blades to permit safe ejection of personnel from the helicopter under catastrophic conditions and more particularly to the sequential jettisoning of the blades in a predetermined direction so as to safeguard other aircraft in the immediate vicinity and so as to disturb aircraft attitude minimally to thereby permit safe personnel ejection following blade ejection.

2. Description of the Prior Art

In the helicopter blade ejection art, it has been the practice to jettison all blades simultaneously as in Larsen U.S. Pat. No. 3,229,931, however, this practice presents a hazard to adjacent aircraft. Baker et al U.S. Pat. No. 3,352,236 also teaches apparatus which simultaneously ejects helicopter rotor blades, and thereby suffers the same disadvantage as Larsen. In Baker et al U.S. Pat. No. 3,352,513, the helicopter blades are not jettisoned in a predetermined direction but rather the rotor hub and blades are separated from the aircraft and two of the three blades subsequently are severed from the hub and remaining blade, resulting in random blade dispersal. Thereafter, the personnel compartment of the helicopter is parachuted to safety. Such a construction, of course, requires substantial equipment above and beyond that required by the subject matter of this invention.

The prior art does not address the problems of jettisoned blades flying into the path of other aircraft flying in the immediate vicinity, and minimal aircraft attitude change due to blade jettisoning.

SUMMARY OF INVENTION

A primary object of the present invention is to provide apparatus for sequentially separating and jettisoning the blades of a helicopter such that they depart the disabled aircraft in any selected direction, but preferably forward or rearward with respect to the direction of flight of the aircraft so as to present minimum danger to adjacent aircraft and in any selected order so as to have minimum adverse affect upon the disabled helicopter's attitude and therefore permit successful ejection of personnel from the aircraft after blade jettisoning.

It is a further object of the present invention to provide such blade jettisoning which includes a secondary or backup system which causes all blades to be jettisoned simultaneously if the primary system malfunctions in whole or in part.

It is still a further object of the present invention to provide such a helicopter blade separating system which is capable of operating completely independently of the helicopter support systems, which sequentially jettisons all helicopter blades in less than a single helicopter rotor revolution, and which utilizes pyrotechnic equipment of the deflagration or detonation type to cause the blades to jettison in response to sequential signals being generated by a device in the rotor shaft.

This invention permits helicopter blade jettisoning with minimal change to the helicopter rotor, with rapidly acting equipment, with equipment which is inexpensive and presents minimum drag problems, and which is of maximum reliability in view of its redundant nature.

This invention permits helicopter blade jettisoning by the use of pyrotechnic processes, such as deflagrating or detonating lines, which are pilot actuated and extend between the pilot station and the helicopter blades, and which make the transition between the stationary fuselage and the rotating rotor by the use of linear displacement mechanisms which respond to pilot command to extend into the rotor domain so as to be selectively contacted by the blades during rotation.

This invention permits helicopter blade jettisoning by the use of pyrotechnic processes, such as deflagrating or detonating lines, which are pilot actuated and extend between the pilot station and the helicopter blades and which make the transition between the stationary fuselage and the rotating rotor by the use of pyrotechnic lines throughout and utilize the advantage of these lines in jumping the gap between the stationary fuselage and the rotating rotor to continue the deflagration or detonation process.

Other objects and advantages of the present invention may be seen by referring to the following description and claims, read in conjunction with the accompanying drawings.

Figure 1:
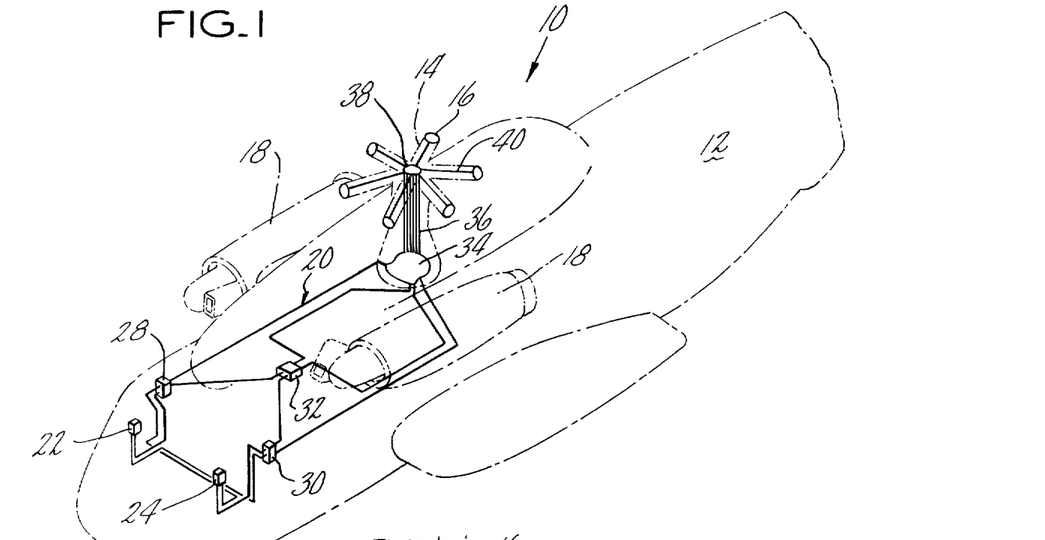
FIG. 1 is a partial perspective showing of a modern helicopter, partially broken away to illustrate this invention in its environment.

Referring to FIG. 1 we see helicopter 10, which includes fuselage 12 supporting rotor 14 for rotation about an axis of rotation. Rotor 14 includes a plurality of blades, such as the six shown in FIG. 1, and each blade has a blade severing linear shaped charge or explosive ring 16 enveloping a structural portion thereof, such as the blade spar. Rotor 14 is powered by engines 18 and serves to support helicopter 10 in flight.

Our helicopter blade detonation system 20 is shown to include pilot and copilot initiators 22 and 24, which are connected through pyrotechnic lines such as 26, and possibly through manifolds or connectors 28 and 30 and time delay mechanism 32 to primary-secondary rotating transfer unit 34 where the energy or signal must be passed from the stationary fuselage 12 to the rotating rotor 14. Detonation lines 36 and rotor head distributor and manifold assembly 38 carry the energy or signal to the individual detonating lines 40 to the various blade severing charge rings 16 on each blade.

It is an important teaching of this invention that the helicopter blades be jettisoned sequentially in a predetermined direction so as to avoid presenting a hazard to adjacent aircraft from scattered rotor blades and to be selectively jettisoned so as to minimally affect aircraft attitude for subsequent ejection of personnel. To explain the sequential operation of the invention, reference will now be made to FIG. 2 which shows a five bladed rotor, with the blades numbered in the direction of rotation, and rotating in the counterclockwise direction. It has been determined analytically that the best sequence of blade jettisoning so as to produce minimal adverse affect on aircraft attitude is to jettison blades number 1, number 3, number 4, number 5, and number 2 individually in that order and in alternating diametric sequence. Further, so that the jettisoned blades will present minimal threat to adjacent aircraft, the blades are to be jettisoned so that the departing blades will leave the aircraft either in a foward or after direction from the aircraft. Due to the various forces acting upon a helicopter blade during rotor operation, a blade which is jettisoned about the 90° degree station (the right lateral position) will depart the aircraft in a forward direction and a blade which is jettisoned at about the 270° station (the left lateral position) will depart the aircraft in a rearward direction. Pilot actuated initiator 22, imparts energy to the material in deflagration line 26 so as to trigger linear actuator 42 to cause firing pin 44 to move from its FIG. 2 solid line to its FIG. 2 phantom line position. The indexing blade, which is blade number 1, is the only blade which carries cam mechanism 46 for rotation therewith and cam mechanism 46 is positioned so as to intercept firing pin 44 and detonate the charge in deflagration line 48 to actuate linear actuator 50 and bring actuating cam 52 from its FIG. 2 solid position to its FIG. 2 phantom position, where it will be in position to intercept the firing pins for the detonating charges of each of the helicopter blades. It will therefore be noted that firing pin 44 cooperated with cam 46 to identify the indexing blade number 1 and that indexing blade number 1 served to arm the helicopter blade jettisoning system 20 by moving firing cam 52 into operating position when cam 46 on blade 1 intercepted firing pin 44.

Figure 2:
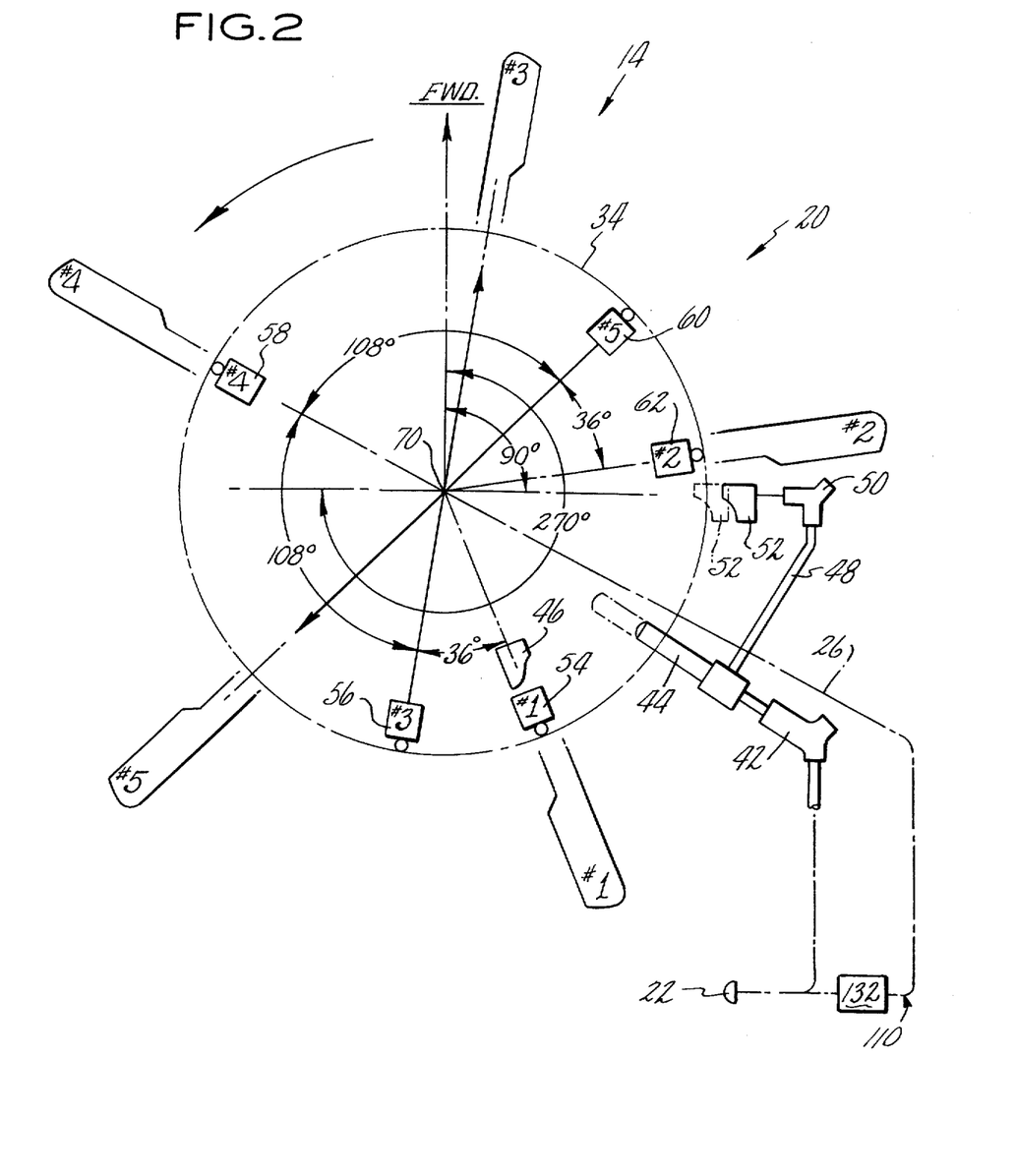
FIG. 2 is a schematic showing of the helicopter blade jettisoning system illustrating its operation on a five bladed helicopter so as to assist in the description of the sequence of blade jettisoning and the angular rotation of the rotor between the jettisoning of the respective blades.

It will be noted that cam 52 is at the 90° station of transfer unit 34 and, in its phantom, charged or armed, position, is in position to intercept the various firing pins of the blades as they pass thereby. FIG. 2 shows that when cam 52 is moved to its phantom or armed position, the firing pin 54 of blade number 1 is the first firing pin to contact cam 52 and to be actuated thereby to initiate the detonating or deflagration action in the line which connects firing pin 54 to the detonating ring 16 of blade number 1. Accordingly, blade number 1 will be jettisoned at substantially the rotor 90° station and will therefore travel forwardly with respect to the helicopter. The next firing pin to contact cam 52 is the firing pin 56 of blade 3. This takes place when the rotor has rotated 36° beyond the station where blade number 1 was jettisoned and it should be noted by viewing FIG. 2 that firing pin 56 of blade 3 is on the opposite side of the rotor from blade 3 and connected thereto through appropriate deflagrating or detonating lines so as to jettison blade 3 as the second blade to be jettisoned and at the rotor 270° station so that blade 3 will depart the aircraft in an after direction. Firing pin 58 of blade 4 will next contact actuating cam 52 at the rotor 90° station after the rotor has rotated 108° following the jettisoning of blade 3. Since blade 4 is being jettisoned at the 90° station, like blade number 1, it will depart the aircraft in a forward direction. Firing pin 60 of blade number 5 will next contact actuating cam 52 and, since firing pin 60 is on the opposite side of the rotor from blade number 5, blade number 5, like blade number 3, will be jettisoned from the rotor 270° station and hence will depart the helicopter in an after or rearward direction. Blade 5 is jettisoned after the rotor has rotated 108° following the jettisoning of blade number 4. Finally, firing pin 62 of blade number 2 contacts actuating cam 52 after the rotor has rotated 36° following the jettisoning of blade number 5 and blade number 2 will therefore be jettisoned at the rotor 90° station and depart the aircraft at a forward direction. It will therefore be noted that utilizing our helicopter blade jettisoning device 20 shown schematically and diagramatically in FIG. 2, each of the five helicopter blades have been jettisoned individually and sequentially in either a forward or after direction with blades 1, 4, and 2 departing the aircraft in a forward direction and blades 3 and 5 departing the aircraft in an after direction alternately with the forwarding departing blades. It will be noted that all blades have been jettisoned within one revolution of rotor 14 or within approximately ⅓ of a second. Analysis has shown that two seconds after jettisoning the last blade using the 1–3–4–5–2 sequence of the five bladed rotor as shown in FIG. 2, the aircraft will have approximately 0° roll and approximately 20° upward pitch so that it is in suitable position for personnel evacuation, for example, by jettison capsule or seats.

Figure 3:
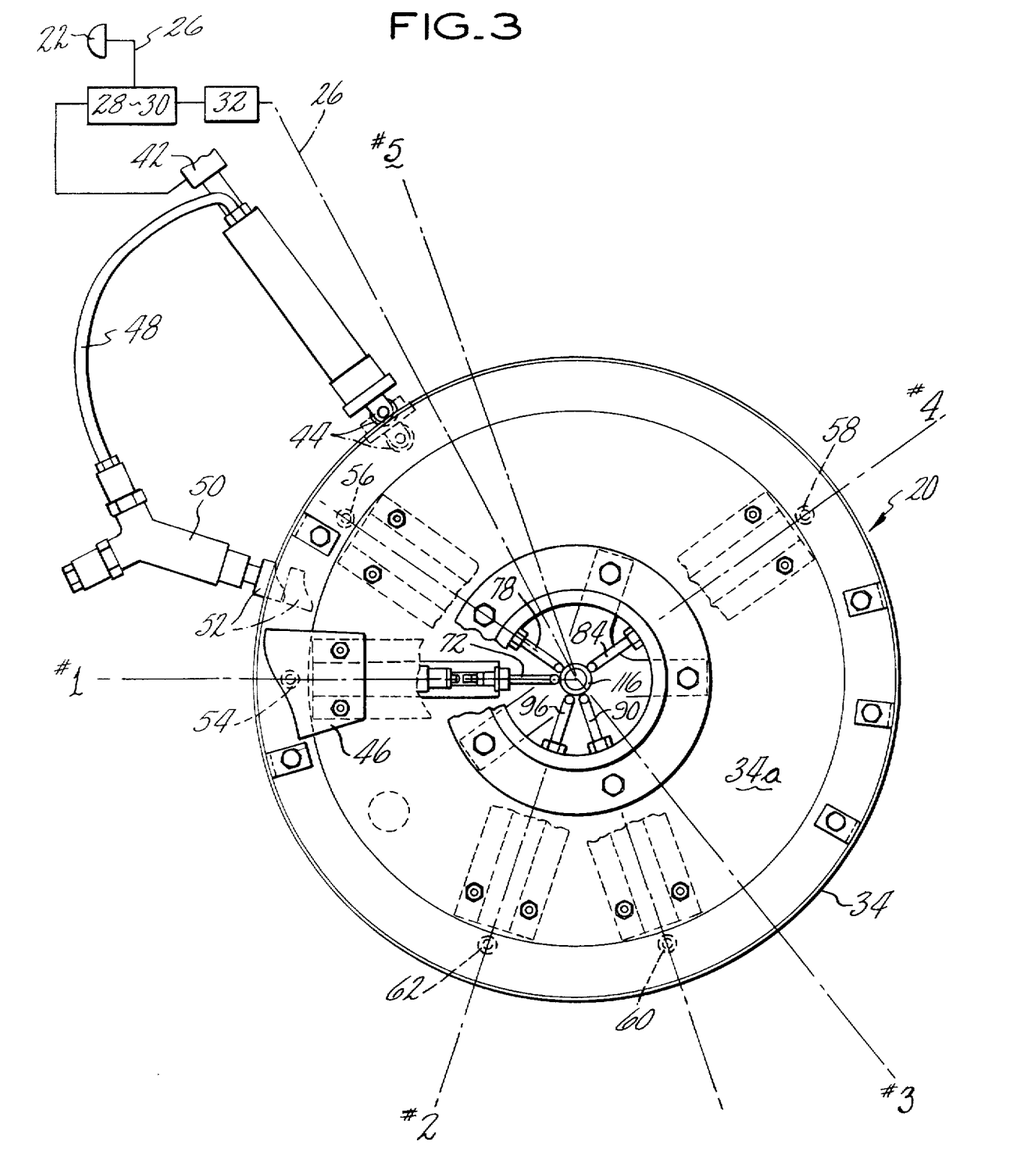
FIG. 3 is a top view of our helicopter blade jettisoning apparatus, to show the device in greater particularity.
Figure 4:
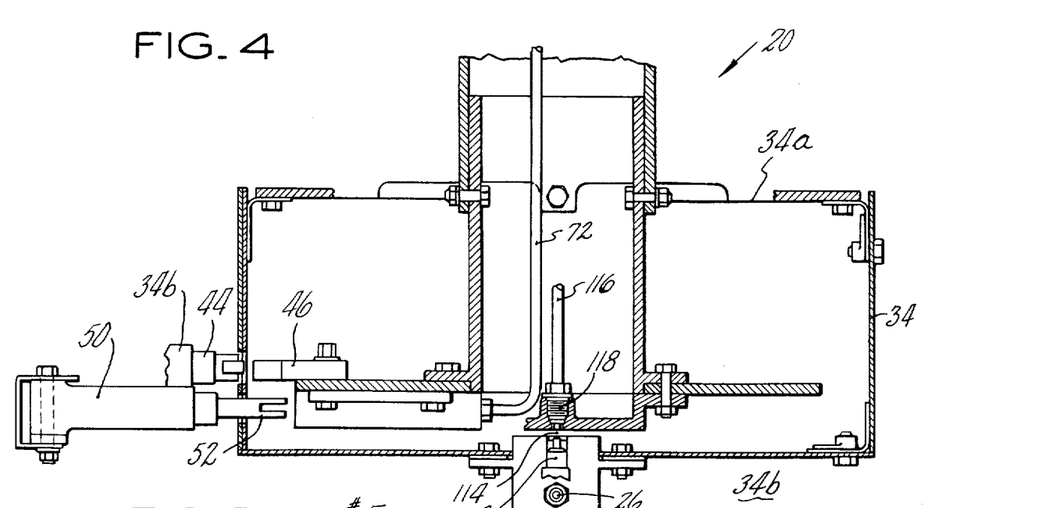
FIG. 4 is a cross-sectional view of FIG. 3.
Figure 5:
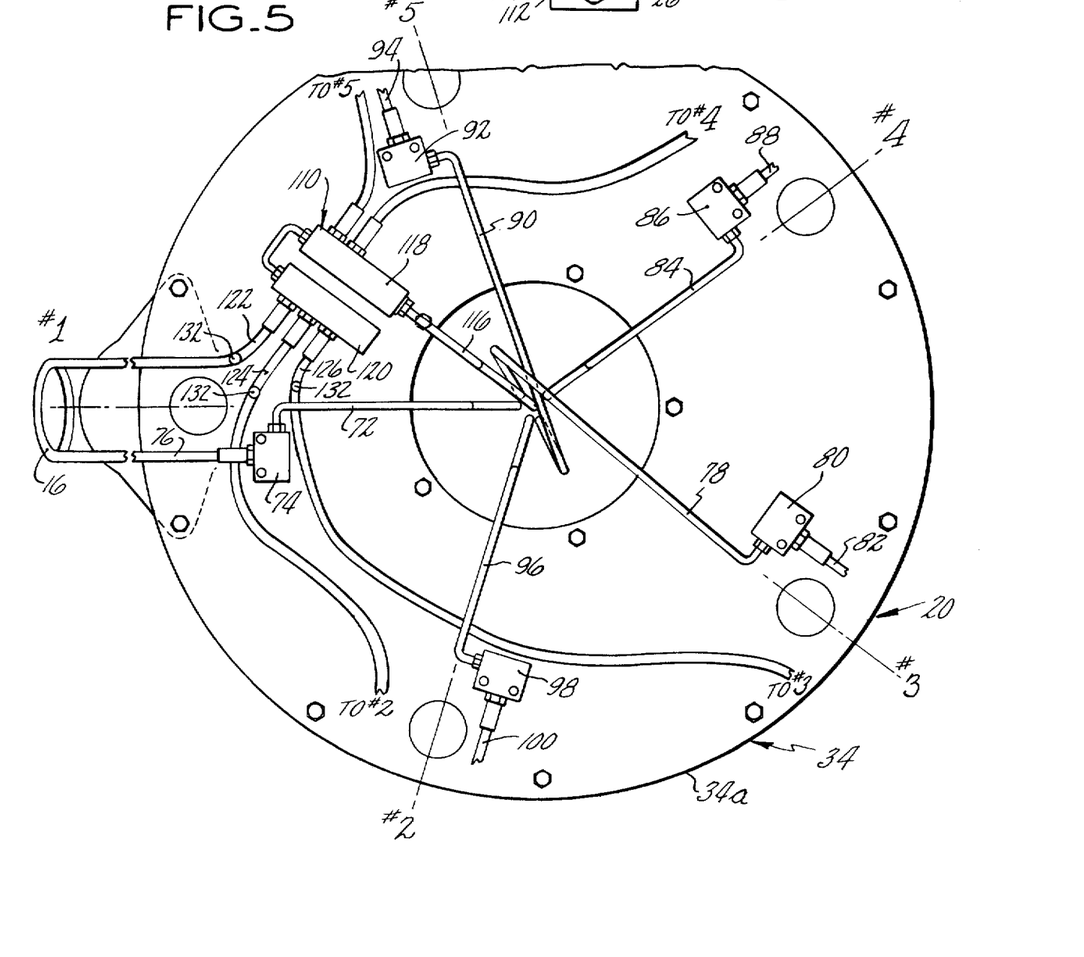
FIG. 5 is a top view of our helicopter blade jettisoning equipment to show the deflagration and detonation lines running from the rotor head to the various blades.
Figure 6:
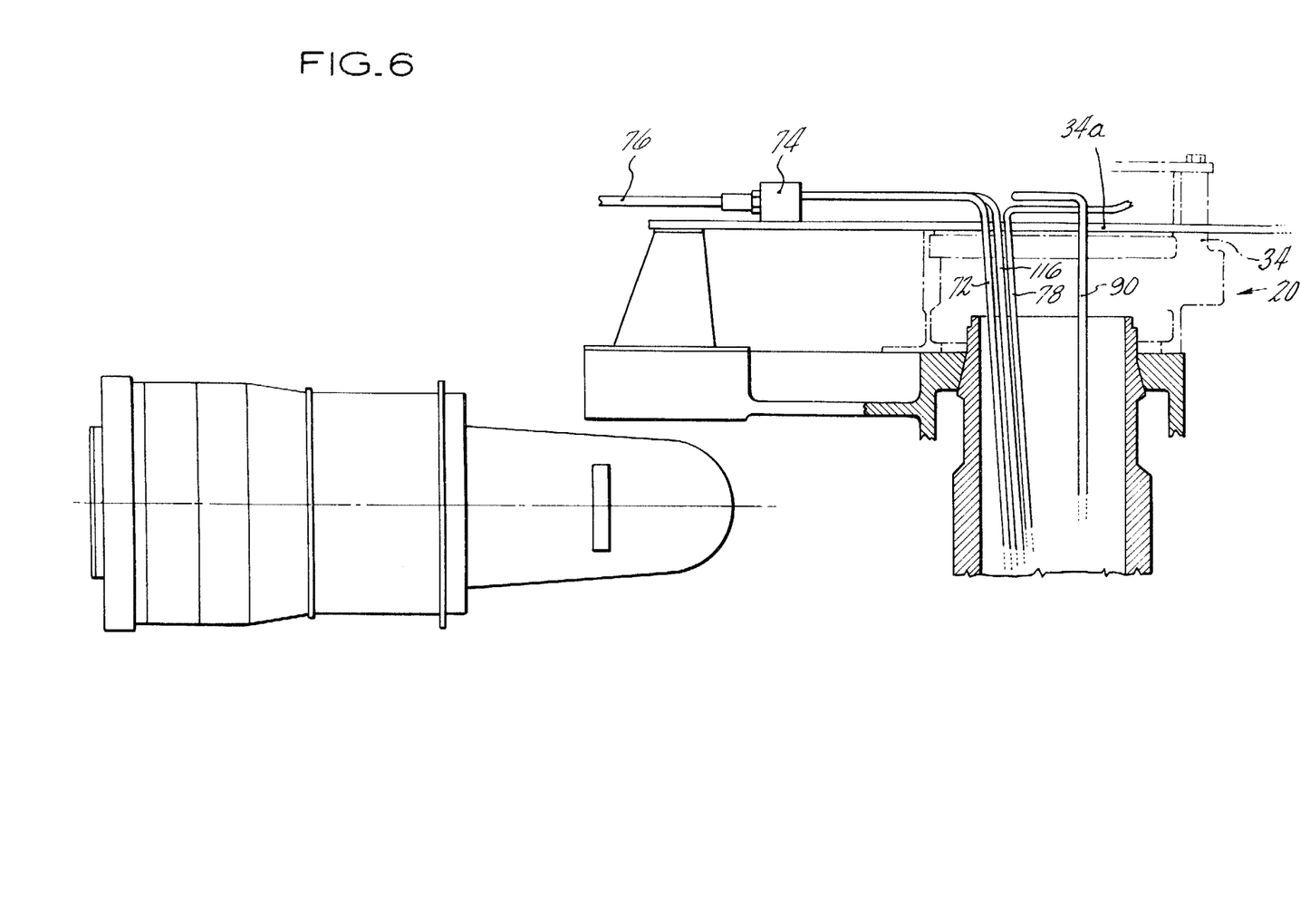
FIG. 6 is substantially a cross-sectional showing of FIG. 5 view.

Referring to FIGS. 3 through 6, we see the helicopter blade jettisoning system 20 in greater particularity. The inboard portion 34A of transfer unit is mounted for rotation with helicopter rotor 14 about axis 70 and the stationary portion 34B envelops the rotary portion 34A. Generally speaking, FIGS. 3 and 4 show the mechanics of the system which serves to arm the system and cause initiation of the various actuating lines to the jettisonable blades, while FIGS. 5 and 6 depict the actuating lines as they extend from the transfer unit 34 to the blades per se. It will be noted by viewing FIG. 4 that cam 46 of blade number 1 and system initiator firing pin 44 are positioned in the same plane and that actuating cam 52 is positioned slightly above, in the same plane as the various blade firing pins 54–62. As best shown in FIG. 3, when cam 46 intercepts initiator firing pin assembly 44, such establishes a detonating or deflagrating phenomenon in line 48 so as to actuate primary linear actuator 50 to bring initiator trigger cam 52 into its armed or FIG. 3 phantom line position. When firing pin 54 of blade number 1 contacts trigger cam 52, a detonating or deflagrating phenomenon occurs in line 72, and the actuating signal is passed therethrough to manifold or connector 74 and then passes through detonating line 76 to detonating ring 16 of blade number 1, thereby jettisoning blade number 1. The material used in deflagrating line 72 could be RDX and the material used in detonating line 76 could be DIPAM, as is commonly known in the explosives field. When firing pin 56 of blade 3 contacts trigger cam 52, a similar action is established in deflagration line 78 and the jettisoning signal is carried therethrough to manifold or connector 80 and then detonating line 82 to the detonating ring 16 of blade number 3. When firing pin 58 of blade number 4 contacts trigger cam 52, the deflagration phenomenon is set up in line 84 and, similar to the action of blades 1 and 3, this blade jettisoning signal is passed through manifold or joint 86 and detonating line 88 to detonating ring 16 of blade number 4 to jettison blade number 4. When firing pin 60 of blade number 5 contacts trigger cam 52, a similar deflagrating phenomenon is established in power train line 90 and, similar to the previously described blade systems, jettisoning force brought to detonating ring 16 of blade 5 through manifold 92 and detonating line 94. Finally, when firing pin 62 of blade number 2 contacts trigger cam 52, the deflagration propagation phenomena is established in line 96 and provides the detonating signal and initiation to detonating ring 16 of blade number 2 by passage through manifold 98 and detonating line 100.

As previously mentioned, in addition to the primary blade jettisoning system just described, in which the blades are sequentially jettisoned, there is also an auxiliary or backup blade jettisoning system 110 which will now be described. In this auxiliary or backup blade jettisoning system, the blades are jettisoned simultaneously but the system is so set up that it will operate only after the primary, sequential system has had sufficient time in which to operate. Accordingly, the secondary system will result in blade jettison only when the primary jettisoning system has malfunctioned in whole or in part. The secondary system 110 is actuated by the cockpit initiator 22 simultaneously with the primary system, and is also of the pyrotechnic type, whether deflagration or detonation. Initiator 22 causes a deflagration action to take place in line 26, which passes through manifolds 28–30 of FIG. 3, and through delay mechanism 32, which can either be a series of coils in deflagration line 26 or a slower reacting mixture therein, and will eventually ignite donor jet 112, shown in FIG. 4. Donor jet 112 is filled with an ignitable material and serves to project a burning flame across gap 114 to actuate or initiate a deflagration action in line 116. When the donor jet is received in receptor 118, as best shown in FIGS. 5 and 6, the deflagration phenomenon taking place in line 116 provides a signal to manifold 119 and 120 so that jettisoning signals are passed therefrom simultaneously through detonator lines 122, 124 and 126 and through detonator lines 128 and 130 to blades 1, 2, 3, 5, and 4, respectively. To assure that a detonating action from the action of the primary system does not pass in the reverse direction through any of lines 122–130, a state-of-the-art check valve or one-way member, such as 132, is positioned in each of lines 122–130.

It will accordingly be seen that the blade jettisoning system taught herein includes a primary system in which the blades are sequentially jettisoned so that all blades leave the aircraft, and alternately, in the instance shown here, in forward and/or after or rearward directions and so that the jettisoning of the blades produces minimum adverse effect upon aircraft attitude. The blade jettisoning system also includes a secondary or backup system which is time delayed behind the primary system and which will serve to jettison simultaneously all or any blades not jettisoned by action of the primary system. Both the primary system and the secondary system, whether deflagration or detonation types, are conventional in the art.

While the blade jettisoning system has been described using a five bladed rotor, it will be evident to those skilled in the art that it is equally applicable to a rotor having a different odd number of blades.

Further, while the constructions previously described direct themselves to the jettisoning of blades from a helicopter having an odd number of blades, this invention is also applicable to the jettisoning of blades from a helicopter having an even number of blades, such as 2, 4, 6, or 8. The jettisoning of an even number of blades is easier to accomplish because aircraft attitude is disturbed minimally by jettisoning simultaneously diametrically opposed or positioned pairs of blades in an even bladed rotor system. Accordingly, in an even numbered bladed rotor system it is not necessary to ascertain the indexing or number 1 blade as is the situation for the odd blade system, such as the five bladed system shown in FIGS. 2 through 6.

Figures 7, 8:
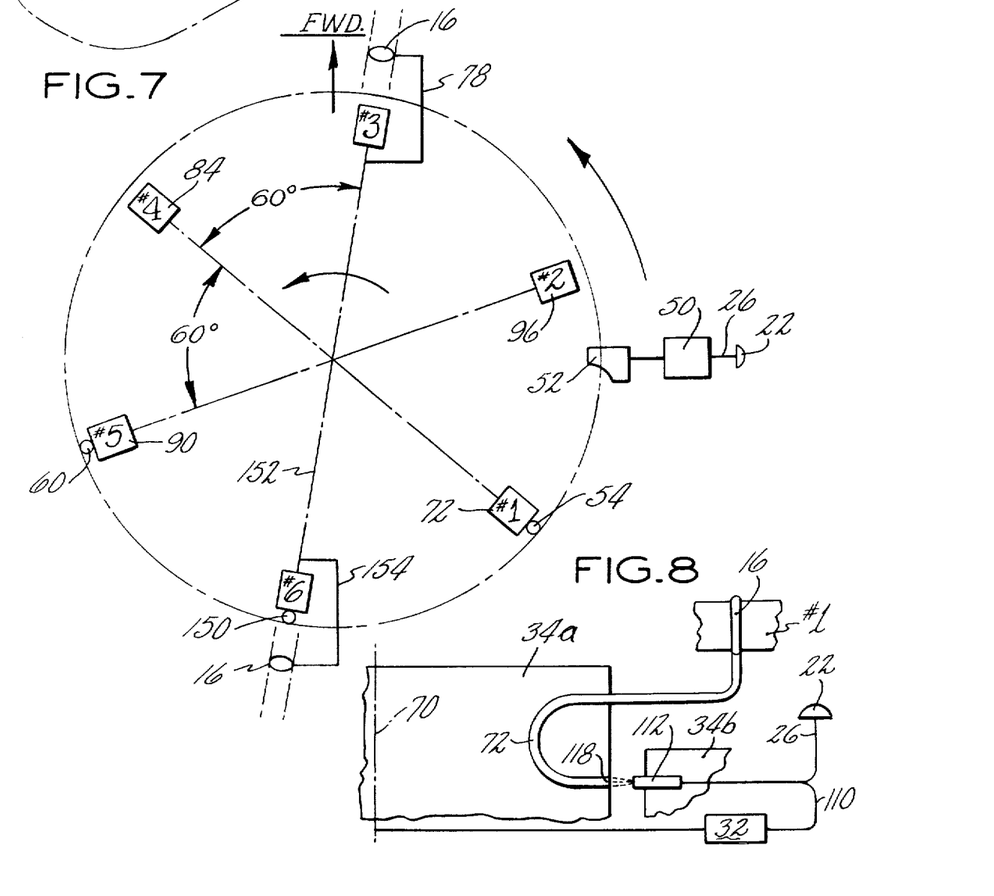
FIG. 7 is a diagramatic representation of the operation of our helicopter blade jettisoning device on a helicopter rotor having an even number of blades.
FIG. 8 illustrates a modification of this invention in which energy transfer between the stationary fuselage and the rotating rotor head to produce blade jettisoning is accomplished by positioning a continuously firing rocket member in the stationary fuselage to be intermittently intercepted by receptors of deflagrating power trains or lines to the various blades of the helicopter rotor.

FIG. 7 depicts this jettisoning system applied to a six bladed helicopter. The blades are numbered 1–6 for discussion only. Pilot actuated initiator 22 acts through deflagration line 26 and linear actuator 50 to actuate triggering cam 52 into its armed position to be intercepted, for example, by the firing pin 54 of blade number 1, which is connected by appropriate deflagration or detonating transfer and cross-over lines to act to initiate deflagration action in both line 72 to blade 1 and line 84 to blade 4. The system of connectors, lines, and detonating rings 16 on each blade would be as shown in FIGS. 3 through 6. Firing pin 150 of blade 6, when triggered by triggering cam 52 acts through deflagration line 152 to simultaneously initiate a deflagration or detonation action in lines 154 and 78 to detonating rings 16 on blades 3 and 6. In similar fashion, when firing pin 60 of blade number 5 contacts trigger cam 52, deflagration signals are sent to detonate rings 16 simultaneously on blades 2 and 5 through lines 96 and 90. It will accordingly be seen that in the FIG. 7 construction, blade pairs 1 and 4 will be jettisoned simultaneously, followed by blade pairs 3 and 6, followed by blade pairs 2 and 5. A backup jettisoning system, such as system 110 of FIGS. 3 through 6 would preferably also be used with the FIG. 7 six bladed construction.

Since deflagrating and detonating materials have the property that propagation can take place across substantial gaps, FIG. 8 is included to depict a substitute for the linear actuator system of the FIG. 3 through 6 construction to bridge the gap between the stationary fuselage and rotating rotor. In this FIG. 8 construction, a small rocket or donor jet 112 is positioned selectively in the stationary portion 34B of the transfer unit 34, similar to the location of trigger cam 52. Each of the blades, such as blade number 1, has a deflagrating or detonating fuse, wick or transfer line, such as 72, extending therethrough so as to connect to detonating ring 16. Accordingly, whenever detonation of the various blades, including blade 1, is desired the pilot would actuate initiator 22, which will ignite small rocket or donor jet 112 in conventional fashion such that jet 112 serves to initiate deflagration or detonation action in the lines 72–96 to each of the blades 1 through 5 or 6, as the receptor end 118 of each such line passes by stationary donor jet 112. In this fashion, the very difficult problem of transferring energy between stationary portion 34B of the transfer unit and the rotary portion 34A thereof is accomplished without the need for moving parts, such as the linear actuators 42 and 52 of the FIG. 3–6 construction. It should be borne in mind that the FIG. 8 system, wherein the pyrotechnic gap bridging mechanism substituted for the linear displacement means in the transfer unit 34, is applicable to helicopters having an odd number of blades as depicted in FIGS. 2–6 or to those having an even number of blades depicted in FIG. 7.

We wish it to be understood that we do not desire to be limited to the exact details of construction shown and described, for obvious modifications will occur to a person skilled in the art.

We claim:

1. In combination:
   A. a helicopter,
   B. a helicopter rotor adapted to be mounted for rotation about an axis of rotation,
   C. a plurality of helicopter blades connected to said rotor for rotation therewith, and
   D. means for sequentially separating said blades from said rotor such that the separated blades will travel in a predetermined direction with respect to the helicopter.

2. A helicopter in accordance with claim 1 and further including backup means to simultaneously separate said blades from said rotor in the event of malfunction of said sequential separating means.

3. A helicopter according to claim 1 wherein said separating means includes means to cause said blades to alternately travel in a forward or an after direction after separation from the rotor head.

4. In combination:
   A. a helicopter,
   B. a helicopter rotor adapted to be mounted for rotation about an axis of rotation,
   C. a plurality of helicopter blades connected to said rotor for rotation therewith, and
   D. means for sequentially separating said blades individually from said rotor in flight.

5. A helicopter in accordance with claim 4 and further including backup means to simultaneously separate said blades from said rotor in the event of malfunction of said sequential separating means.

6. In combination:
   A. a helicopter,
   B. a helicopter rotor adapted to be mounted for rotation about an axis of rotation,
   C. a plurality of helicopter blades connected to said rotor for rotation therewith, and
   D. means for sequentially separating said blades at least one at a time from said rotor such that the separated blades will travel in a fore or aft direction with respect to the helicopter.

7. A helicopter in accordance with claim 6 and further including backup means to simultaneously separate said blades from said rotor in the event of malfunction of said sequential separating means.

8. In combination:
   A. a helicopter,
   B. a helicopter rotor adapted to be mounted for rotation about an axis of rotation,
   C. a plurality of helicopter blades connected to said rotor for rotation therewith and with the blades being even in number and arranged in substantially diametrically opposed pairs, and
   D. means for sequentially separating diametrically opposed pairs of said blades from said rotor.

9. A helicopter in accordance with claim 8 and further including backup means to simultaneously separate said blades from said rotor in the event of malfunction of said sequential separating means.

10. In combination:
    A. a helicopter,
    B. a helicopter rotor adapted to be mounted for rotation about an axis of rotation,
    C. a plurality of helicopter blades connected to said rotor for rotation therewith and with the blades being even in number and arranged in substantially diametrically opposed pairs, and
    D. means for sequentially separating diametrically opposed pairs of said blades from said rotor such that the separated blades will travel in a fore or aft direction with respect to the helicopter.

11. In combination:
    A. a helicopter,
    B. a helicopter rotor adapted to be mounted for rotation about an axis of rotation,
    C. a plurality of helicopter blades connected to said rotor for rotation therewith and with the blades being odd in number, and
    D. means for sequentially separating said blades from said rotor such that each separated blade will travel in a preselected direction with respect to the helicopter.

12. In combination:
    A. a helicopter,
    B. a helicopter rotor adapted to be mounted for rotation about an axis of rotation,
    C. a plurality of helicopter blades connected to said rotor for rotation therewith,
    D. pilot initiated means to detect the position of a selected blade, and
    E. means responsive to the position of said selected blade so detected to sequentially separate said blades from said rotor.

13. In combination:
    A. a helicopter,
    B. a helicopter rotor adapted to be mounted for rotation about an axis of rotation,
    C. a plurality of helicopter blade connected to said rotor for rotation therewith,
    D. an explosive charge connected to each blade and adapted to sever the blade when detonated, and
    E. means for sequentially separating said blades from said rotor such that the separated blades will travel in a fore or aft direction with respect to the helicopter direction of flight and including:
       1. a pilot actuated initiator,
       2. a stationary-to-rotating transfer unit,
       3. a first pyrotechnic conductor line connecting the initiator to the transfer unit,
       4. a series of pyrotechnic conductor lines connecting the transfer unit to the explosive charge on each of said blades,
       5. arming means mounted on said transfer unit, and
       6. initiating means mounted on said transfer unit and connected to be actuatable by said initiator, into an armed position where it is contactable by a selected blade only to arm said arming means so that said detonating charge is caused to explode as each of said blades passes a selected station on the transfer unit to initiate detonating action in the detonating line connecting the transfer unit to that blade.

14. A helicopter in accordance with claim 13 and further including backup means to simultaneously separate said blades from said rotor in the event of malfunction of said sequential separating means.

15. In combination:
   A. a helicopter,
   B. a helicopter rotor adapted to be mounted for rotation about an axis of rotation,
   C. a plurality of helicopter blades connected to said rotor for rotation therewith and each including an explosive charge adapted to sever the blade when detonated, and
   D. means for sequentially separating said blades from said rotor such that the separated blades will travel in a fore or aft direction with respect to the helicopter, including:
      1. a transfer unit including a stationary portion connected to said helicopter and a rotary portion connected for rotation with said rotor,
      2. a deflagration line connecting each of said explosive charges to said transfer unit and having an open ended receptor in said transfer unit rotating portion and adjacent and opening toward said stationary portion, and
      3. a flame projecting device located on said stationary portion and positioned to direct flame into said open ended receptors as each receptor passes thereby during rotor rotation to actuate said deflagration line and sequentially detonate said explosive charges and separate said blades from said rotor.

16. A helicopter in accordance with claim 15 and further including backup means to simultaneously separate said blades from said rotor in the event of malfunction of said sequential separating means.

17. In combination:
   A. a helicopter,
   B. a helicopter rotor adapted to be mounted for rotation about an axis of rotation,
   C. a plurality of helicopter blades connected to said rotor for rotation therewith,
   D. an explosive charge connected to each blade and adapted to sever the blade when detonated, and
   E. means for sequentially separating said blades from said rotor such that the separated blades will travel in a preselected direction with respect to the helicopter direction of flight and including:
      1. a pilot actuated initiator,
      2. a stationary-to-rotating transfer unit,
      3. a first pyrotechnic conductor line connecting the initiator to the transfer unit,
      4. a series of pyrotechnic conductor lines connecting the transfer unit to the explosive charge on each of said blades,
      5. arming means mounted on said transfer unit, and
      6. initiating means mounted on said transfer unit and connected to be actuatable by said initiator, into an armed position where it is contactable by a selected blade only to arm said arming means so that said detonating charge is caused to explode as each of said blades passes a selected station on the transfer unit to initiate detonating action in the detonating line connecting the transfer unit to that blade.

18. In combination:
   A. a helicopter,
   B. a helicopter rotor adapted to be mounted for rotation about an axis of rotation,
   C. a plurality of helicopter blades connected to said rotor for rotation therewith and each including an explosive charge adapted to sever the blade when detonated, and
   D. means for sequentially separating said blades from said rotor such that the separated blades will travel in a preselected direction with respect to the helicopter, including:
      1. a transfer unit including a stationary portion connected to said helicopter and a rotary portion connected for rotation with said rotor,
      2. a deflagration line connecting each of said explosive charges to said transfer unit and having an open ended receptor in said transfer unit rotating portion and adjacent and opening toward said stationary portion, and
      3. a flame projecting device located on said stationary portion and positioned to direct flame into said open ended receptors as each receptor passes thereby during rotor rotation to actuate said deflagration line and sequentially detonate said explosive charges and separate said blades from said rotor.

19. In combination:
   A. a helicopter,
   B. a helicopter rotor adapted to be mounted for rotation about an axis of rotation,
   C. a plurality of helicopter blades connected to said rotor for rotation therewith,
   D. means for sequentially separating said blades from said rotor such that the separated blades will travel in a predetermined direction with respect to the helicopter,
   E. backup means to simultaneously separate said blades from said rotor in the event of malfunction of said sequential separating means, and
   F. wherein the number of helicopter blade is five and the blades are substantially equally spaced circumferentially about the axis of rotation and wherein said first means, when considering said blades to be numbered 1 through 5 in the order of rotation when rotating in a counterclockwise direction when viewed from above, will be separated in the sequence of blade 1, blade 3, blade 4, blade 5 and blade 2, with the blades traveling alternately in a forward or aftward direction in accordance with the sequence of separation.

20. In combination:
   A. a helicopter,
   B. a helicopter rotor adapted to be mounted for rotation about an axis of rotation,
   C. a plurality of helicopter blades connected to said rotor for rotation therewith,
   D. means for sequentially separating said blades from said rotor such that the separated blades will travel in a predetermined direction with respect to the helicopter,
   E. backup means to simultaneously separate said blades from said rotor in the event of malfunction of said sequential separating means,
   F. wherein the number of helicopter blades is five and the blades are substantially equally spaced circumferentially about the axis of rotation and wherein said first means, when considering said blades to be numbered 1 through 5 in the order of rotation when rotating in a counterclockwise direction when viewed from above, will be separated in the sequence of blade 1, blade 3, blade 4, blade 5 and blade 2, with the blades traveling alternately in a forward or aftward direction in accordance with the sequence of separation, and G. wherein said first means causes blades numbers 1, 4 and 2 to travel in a forward direction after separation from the hub and causes blades 3 and 5 to travel in a rearward direction after separation from the helicopter hub.

21. In combination:
A. a helicopter,
B. a helicopter rotor adapted to be mounted for rotation about an axis of rotation,
C. a plurality of helicopter blades connected to said rotor for rotation therewith,
D. means for sequentially separating said blades from said rotor such that the separated blades will travel in a predetermined direction with respect to the helicopter,
E. backup means to simultaneously separate said blades from said rotor in the event of malfunction of said sequential separating means,
F. wherein the number of helicopter blades is five and the blades are substantially equally spaced circumferentially about the axis of rotation and wherein said first means, when considering said blades to be numbered 1 through 5 in the order of rotation when rotating in a counterclockwise direction when viewed from above, will be separated in the sequence of blade 1, blade 3, blade 4, blade 5 and blade 2, with the blades traveling alternately in a forward or aftward direction in accordance with the sequence of separation,
G. wherein said first means causes blades numbers 1, 4 and 2 to travel in a forward direction after separation from the hub and causes blades 3 and 5 to travel in a rearward direction after separation from the helicopter hub, and
H. wherein the helicopter rotor rotates 36° in a counterclockwise direction when viewed from above between the separation of blades 1 and 3, 108° between the separation of blades 3 and 4, 108° between the separation of blades 4 and 5, and 36° between the separation of blades 5 and 2.

22. In combination:
A. a helicopter,
B. a helicopter rotor adapted to be mounted for rotation about an axis of rotation,
C. a plurality of helicopter blades connected to said rotor for rotation therewith and with the blades being odd in number,
D. means for sequentially separating said blades individually from said rotor such that the separated blades will travel in a fore or aft direction with respect to the helicopter, and
E. wherein said sequential blade separating means includes first means to detect the position of a selected blade, and second means responsive to said detection means to sequentially individually separate the blades from said rotor with said selected blade being separated first.

23. In combination:
A. a helicopter,
B. a helicopter rotor adapted to be mounted for rotation about an axis of rotation,
C. a plurality of helicopter blades connected to said rotor for rotation therewith and with the blades being odd in number,
D. means for sequentially separating said blades individually from said rotor such that the separated blades will travel in a fore or aft direction with respect to the helicopter,
E. wherein said sequential blade separating means includes first means to detect the position of a selected blade, and second means responsive to said detection means to sequentially individually separate the blades from said rotor with said selected blade being separated first, and
F. further including backup means to simultaneously separate said blades from said rotor in the event of malfunction of said sequential separating means.

24. In combination:
A. a helicopter,
B. a helicopter rotor adapted to be mounted for rotation about an axis of rotation,
C. a plurality of helicopter blades connected to said rotor for rotation therewith,
D. pilot initiated means to detect the position of a selected blade,
E. means responsive to the position of said selected blade so detected to sequentially individually separate said blades from said rotor, and
F. wherein said first means is a linear actuated means adapted, when actuated, to position the firing pin of a sequential blade separating system so as to be intercepted and actuated by a selected blade, thereby arming blade sequential separating means.

25. In combination:
A. a helicopter,
B. a helicopter rotor adapted to be mounted for rotation about an axis of rotation,
C. a plurality of blades connected to said rotor for rotation therewith,
D. a stationary-rotary transfer unit including a stationary portion connected to the helicopter fuselage and a rotary portion connected to the rotor and defining a gap between the stationary and rotary portions of the transfer unit,
E. means to separate said blades from said rotor including a pyrotechnic line extending from said fuselage to said blades and being continuous except across said gap in said transfer unit such that initiation of said pyrotechnic action will pass through said pyrotechnic line in said fuselage, bridge said gap, and then pass through said pyrotechnic line in said rotary portion of said transfer unit of said blade for said jettisoning the blade, and including:
1. a donor jet connected to said pyrotechnic line to be ignited thereby and positioned in the stationary portion of the transfer unit and oriented to direct a burning flame across the transfer unit gap and against the transfer unit stationary portion, and
2. a receptor connected to said pyrotechnic line and positioned in the rotary portion of said transfer unit to be in alignment with said donor jet to receive the burning flame therefrom.

26. In combination:
A. a helicopter,
B. a helicopter rotor adapted to be mounted for rotation about an axis of rotation,
C. a plurality of helicopter blades connected to said rotor for rotation therewith,
D. means for sequentially separating said blades from said rotor such that the separated blades will travel in a selected direction with respect to the helicopter, including:
1. a stationary-rotary transfer unit including a stationary portion connected to the helicopter and a rotary portion connected to establish a gap therebetween,
2. a pyrotechnic line extending through at least a portion of the helicopter to the stationary portion of the transfer unit and then through the rotary portion of the transfer unit to each blade and being continuous except across said gap,
3. a donor jet connected to said pyrotechnic line to be ignited thereby and positioned in the stationary portion of the transfer unit and oriented to direct a burning flame across the transfer unit gap and against the transfer unit stationary portion, and
4. a receptor connected to said pyrotechnic line and positioned in the rotary portion of said transfer unit to be in alignment with said donor jet when rotating therepast to receive the burning flame therefrom so that initiation of energy in said pyrotechnic line will pass through the portion thereof in said helicopter, bridge said gap then pass to said blade to jettison said blade.

27. A helicopter according to claim 26 and further including backup means to simultaneously separate said blade from said rotor in the event of malfunction of said sequential separating means.

28. In combination:
A. a helicopter,
B. a helicopter rotor adapted to be mounted for rotation about an axis of rotation,
C. a plurality of helicopter blades connected to said rotor for rotation therewith,
D. means for sequentially separating siad blades from said rotor such that the separated blades will travel in a predetermined direction with respect to the helicopter, and
E. wherein the number of helicopter blades is five and the blades are substantially equally spaced circumferentially about the axis of rotation and wherein said first means, when considering said blades to be numbered 1 through 5 in the order of rotation when rotating in a counterclockwise direction when viewed from above, will be separated in the sequence of blade 1, blade 3, blade 4, blade 5 and blade 2, with the blades traveling alternately in a forward or aftward direction in accordance with the sequence of separation.

29. In combination:
A. a helicopter,
B. a helicopter rotor adapted to be mounted for rotation about an axis of rotation,
C. a plurality of helicopter blades connected to said rotor for rotation therewith,
D. means for sequentially separating said blades from said rotor such that the separated blades will travel in a predetermined direction with respect to the helicopter,
E. wherein the number of helicopter blades is five and the blades are substantially equally spaced circumferentially about the axis of rotation and wherein said first means, when considering said blades to be numbered 1 through 5 in the order of rotation when rotating in a counterclockwise direction when viewed from above, will be separated in the sequence of blade 1, blade 3, blade 4, blade 5 and blade 2, with the blades traveling alternately in a forward or aftward direction in accordance with the sequence of separation, and
F. wherein said first means causes blades numbers 1, 4 and 2 to travel in a forward direction after separation from the hub and causes blades 3 and 5 to travel in a rearward direction after separation from the helicopter hub.

30. In combination:
A. a helicopter,
B. a helicopter rotor adapted to be mounted for rotation about an axis of rotation,
C. a plurality of helicopter blades connected to said rotor for rotation therewith,
D. means for sequentially separating said blades from said rotor such that the separated blades will travel in a predetermined direction with respect to the helicopter,
E. wherein the number of helicopter blades is five and the blades are substantially equally spaced circumferentially about the axis of rotation and wherein said first means, when considering said blades to be numbered 1 through 5 in the order of rotation when rotating in a counterclockwise direction when viewed from above, will be separated in the sequence of blade 1, blade 3, blade 4, blade 5 and blade 2, with the blades traveling alternately in a forward or aftward direction in accordance with the sequence of separation,
F. wherein said first means causes blades numbers 1, 4 and 2 to travel in a forward direction after separation from the hub and causes blades 3 and 5 to travel in a rearward direction after separation from the helicopter hub, and
G. wherein the helicopter rotor rotates 36° in a counterclockwise direction when viewed from above between the separation of blades 1 and 3, 108° between the separation of blades 3 and 4, 108° between the separation of blades 4 and 5, and 36° between the separation of blades 5 and 2.

31. In combination:
A. a helicopter,
B. a helicopter rotor adapted to be mounted for rotation about an axis of rotation,
C. a plurality of helicopter blades connected to said rotor for rotation therewith and with the blades being even in number and arranged in substantially diametrically opposed pairs,
D. jettisoning means responsive to the position of a selected blade relative to the helicopter for separating at least one diametrically opposed pair of said blades from said rotor, and
E. means to arm said jettisoning means.

32. A helicopter in accordance with claim 31 and further including backup means to simultaneously separate said blades from said rotor in the event of malfunction of said sequential separating means.

33. In combination:
A. a helicopter,
B. a helicopter rotor adapted to be mounted for rotation about an axis of rotation,
C. a plurality of helicopter blades connected to said rotor for rotation therewith,
D. an explosive charge connected to each blade and adapted to sever the blade when detonated, and
E. means for sequentially separating said blades from said rotor such that the separated blades will travel it a fore or aft direction with respect to the helicopter direction of flight and including:
1. a pilot actuated initiator,
2. a stationary-to-rotating transfer unit,
3. a first pyrotechnic condutor line connecting the initiator to the transfer unit,
4. a series of pyrotechnic conductor lines connecting the transfer unit to the explosive charge on each of said blades,
5. arming means mounted on said transfer unit, and
6. initiating means mounted on said transfer unit and connected to be actuatable by said initiator, into an armed position where it is contactable by a selected blade only to arm said arming means so that said detonating charge is caused to explode as each of said blades passes a selected station on the transfer unit to initiate detonating action in the detonating line connecting the transfer unit to that blade, and F. wherein said blade separating means includes:
1. a transfer unit including a stationary portion connected to said helicopter and a rotary portion connected for rotation with said rotor,
2. a deflagration line connecting each of said explosive charges to said tranfer unit and having an open ended receptor in said transfer unit rotating portion and adjacent and opening toward said stationary portion, and
3. a flame projecting device located on said stationary portion and positioned to direct flame into said open ended receptors as each receptor passes thereby during rotor rotation to actuate said deflagration line and sequentially detonate said explosive charges and separate said blades from said rotor.

34. In combination:
A. a helicopter,
B. a helicopter rotor adapted to be mounted for rotation about an axis of rotation,
C. a plurality of helicopter blades connected to said rotor for rotation therewith,
D. an explosive charge connected to each blade and adapted to sever the blade when detonated, and
E. means for sequentially separating said blades from said rotor such that the separated blades will travel in a fore or aft direction with respect to the helicopter direction of flight and including:
1. a pilot actuated initiator,
2. a stationary-to-rotating transfer unit,
3. a first pyrotechnic conductor line connecting the initiator to the transfer unit,
4. a series of pyrotechnic conductor lines connecting the transfer unit to the explosive charge on each of said blades,
5. arming means mounted on said transfer unit, and
6. initiating means mounted on said tranfer unit and connected to be actuatable by said initiator, into an armed position where it is contactable by a selected blade only to arm said arming means so that said detonating charge is caused to explode as each of said blades passes a selected station on the transfer unit to initiate detonating action in the detonating line connecting the transfer unit to that blade, F. wherein said blade separating means includes:
1. a transfer unit including a stationary portion connected to said helicopter and a rotary portion connected for rotation with said rotor,
2. a deflagration line connecting each of said explosive charges to said transfer unit and having an open ended receptor in said transfer unit rotating portion and adjacent and opening toward said stationary portion, and
3. a flame projecting device located on said stationary portion and positioned to direct flame into said open ended receptors as each receptor passes thereby during rotor rotation to actuate said deflagration line and sequentially detonate said explosive charges and separate said blades from said rotor, and G. backup means to simultaneously separate said blades from said rotor in the event of malfunction of said sequential separating means.

* * * * *